United States Patent
Wenger et al.

(10) Patent No.: US 9,917,457 B2
(45) Date of Patent: Mar. 13, 2018

(54) POWER TOOL WITH USB CONNECTION

(71) Applicant: BLACK & DECKER INC., New Britain, CT (US)

(72) Inventors: Kevin Wenger, Baltimore, MD (US); Kelly E. Dyer, Silver Spring, MD (US); Corey Barnett, Bowie, MD (US); David A. Miller, Baltimore, MD (US); Daniele C. Brotto, Baltimore, MD (US)

(73) Assignee: Black & Decker Inc., New Britian, CT (US)

( * ) Notice: Subject to any disclaimer, the term of this patent is extended or adjusted under 35 U.S.C. 154(b) by 212 days.

(21) Appl. No.: 15/009,038

(22) Filed: Jan. 28, 2016

(65) Prior Publication Data

US 2016/0226277 A1 Aug. 4, 2016

Related U.S. Application Data

(60) Provisional application No. 62/110,773, filed on Feb. 2, 2015, provisional application No. 62/132,149, filed (Continued)

(51) Int. Cl.
*H02J 7/00* (2006.01)
*B25F 5/00* (2006.01)

(52) U.S. Cl.
CPC .............. *H02J 7/0044* (2013.01); *B25F 5/00* (2013.01); *H02J 7/007* (2013.01); *H02J 7/0054* (2013.01);
(Continued)

(58) Field of Classification Search
CPC ........ H02J 7/0044; H02J 7/0054; H02J 7/007; H02J 2007/0062; B25F 5/00
(Continued)

(56) References Cited

U.S. PATENT DOCUMENTS

| 4,455,523 A | 6/1984 | Koenck |
| 4,553,081 A | 11/1985 | Koenck |

(Continued)

FOREIGN PATENT DOCUMENTS

| CN | 2900699 | 4/2006 |
| CN | 201260089 | 6/2009 |

(Continued)

OTHER PUBLICATIONS

"Cordless Batteries" www.dewalt.com/tools/cordless-batteries-dcb200.aspx Product DCB200 20v Lithium Ion Battery Pack. Web page and six (6) views of product. (Accessed Feb. 19, 2016).
(Continued)

*Primary Examiner* — Edward Tso
*Assistant Examiner* — Aaron Piggush
(74) *Attorney, Agent, or Firm* — Michael Aronoff

(57) ABSTRACT

A battery pack includes a housing, at least one battery cell housed in the housing, a wireless transmitter housed in the housing, a button that initiates a pairing with an electronic device so that the battery pack may wirelessly communicate with the electronic device through the wireless transmitter, a connection section including a first electrical connector configured to supply power to a power tool and a charging port configured to supply power to an external device. The charging port can be in an on state in which the charging port is operable to supply power to the external device and an off state in which the charging port is not operable to supply power to the external device.

20 Claims, 16 Drawing Sheets

Related U.S. Application Data on Mar. 12, 2015, provisional application No. 62/132,245, filed on Mar. 12, 2015, provisional application No. 62/209,490, filed on Aug. 25, 2015, provisional application No. 62/248,456, filed on Oct. 30, 2015, provisional application No. 62/251,956, filed on Nov. 6, 2015.

(52) U.S. Cl.
CPC ..... *H02J 7/0042* (2013.01); *H02J 2007/0062* (2013.01); *H02J 2007/0098* (2013.01)

(58) Field of Classification Search
USPC .................................. 320/112, 114, 133, 155
See application file for complete search history.

(56) References Cited

U.S. PATENT DOCUMENTS

| | | | |
|---|---|---|---|
| 4,709,202 | A | 11/1987 | Koenck et al. |
| 4,716,354 | A | 12/1987 | Hacker |
| 4,737,702 | A | 4/1988 | Koenck |
| 4,885,523 | A | 12/1989 | Koenck |
| 4,961,043 | A | 10/1990 | Koenck |
| 5,117,173 | A | 5/1992 | Oliva et al. |
| 5,278,487 | A | 1/1994 | Koenck |
| 5,508,599 | A | 4/1996 | Koenck |
| 5,619,117 | A | 4/1997 | Koenck |
| 5,635,813 | A | 6/1997 | Shiga et al. |
| 5,646,508 | A | 7/1997 | Van Phuoc et al. |
| 5,654,623 | A | 8/1997 | Shiga et al. |
| 5,883,492 | A | 3/1999 | Koenck |
| 5,883,493 | A | 3/1999 | Koenck |
| 5,986,435 | A | 11/1999 | Koenck |
| 6,005,367 | A | 12/1999 | Rohde |
| 6,018,227 | A | 1/2000 | Kumar et al. |
| 6,075,340 | A | 6/2000 | Koenck |
| 6,084,517 | A | 7/2000 | Rabanne et al. |
| 6,084,523 | A | 7/2000 | Gelnovatch et al. |
| 6,160,376 | A | 12/2000 | Kumar et al. |
| D436,917 | S | 1/2001 | Hayakawa et al. |
| 6,211,649 | B1 | 4/2001 | Matsuda |
| 6,252,380 | B1 | 6/2001 | Koenck |
| 6,271,643 | B1 | 8/2001 | Becker et al. |
| 6,304,186 | B1 | 10/2001 | Rabanne et al. |
| 6,307,349 | B1 | 10/2001 | Koenck et al. |
| 6,331,761 | B1 | 12/2001 | Kumar et al. |
| 6,346,793 | B1 | 2/2002 | Shibata et al. |
| 6,362,600 | B2 | 3/2002 | Sakakibara |
| D456,002 | S | 4/2002 | Kato et al. |
| 6,502,949 | B1 | 1/2003 | Horiyama et al. |
| 6,563,290 | B2 | 5/2003 | Sakakibara et al. |
| 6,566,005 | B1 | 5/2003 | Shimma et al. |
| 6,570,504 | B2 | 5/2003 | Rabanne et al. |
| 6,577,104 | B2 | 6/2003 | Sakakibara |
| D477,811 | S | 7/2003 | Niwa et al. |
| D481,672 | S | 11/2003 | Niwa et al. |
| 6,729,413 | B2 | 5/2004 | Turner et al. |
| 6,913,087 | B1 | 7/2005 | Brotto et al. |
| 6,946,817 | B2 | 9/2005 | Fischer et al. |
| D512,961 | S | 12/2005 | Okuda et al. |
| 6,989,748 | B2 | 1/2006 | Rabanne et al. |
| D516,504 | S | 3/2006 | Okuda et al. |
| D523,807 | S | 6/2006 | Murayama et al. |
| 7,064,519 | B2 | 6/2006 | Ito |
| 7,133,703 | B2 | 11/2006 | Aoshima et al. |
| 7,157,180 | B2 | 1/2007 | Lui et al. |
| 7,157,882 | B2 | 1/2007 | Johnson et al. |
| 7,157,883 | B2 | 1/2007 | Johnson et al. |
| 7,164,257 | B2 | 1/2007 | Johnson et al. |
| 7,176,654 | B2 | 2/2007 | Meyer et al. |
| 7,227,333 | B2 | 6/2007 | Yamada et al. |
| 7,238,443 | B2 | 7/2007 | Sakakibara |
| D550,152 | S | 9/2007 | Okuda et al. |
| 7,342,381 | B2 | 3/2008 | Johnson et al. |
| 7,479,762 | B2 | 1/2009 | Bayne et al. |
| 7,492,124 | B2 | 2/2009 | Johnson et al. |
| 7,493,148 | B2 | 2/2009 | Ha et al. |
| 7,504,804 | B2 | 3/2009 | Johnson et al. |
| 7,572,547 | B2 | 8/2009 | Sakakibara |
| 7,573,242 | B2 | 8/2009 | Bayne et al. |
| D606,935 | S | 12/2009 | Murayama et al. |
| 7,667,437 | B2 | 2/2010 | Johnson et al. |
| 7,679,316 | B2 | 3/2010 | Guthrie et al. |
| 7,688,028 | B2 | 3/2010 | Phillips et al. |
| 7,723,952 | B2 | 5/2010 | Phillips et al. |
| 7,791,318 | B2 | 9/2010 | Johnson et al. |
| 7,791,319 | B2 | 9/2010 | Veselic et al. |
| 7,805,263 | B2 | 9/2010 | Mack |
| 7,812,565 | B2 | 10/2010 | Bayne et al. |
| 7,847,517 | B2 | 12/2010 | Guthrie et al. |
| 7,847,520 | B2 | 12/2010 | Veselic et al. |
| 7,863,857 | B2 | 1/2011 | Becker et al. |
| 7,868,591 | B2 | 1/2011 | Phillips et al. |
| 7,879,483 | B2 | 2/2011 | Sakakibara |
| 7,906,940 | B2 | 3/2011 | Veselic et al. |
| 7,944,181 | B2 | 5/2011 | Johnson et al. |
| 7,952,326 | B2 | 5/2011 | Johnson et al. |
| 7,993,772 | B2 | 8/2011 | Sakakibara |
| 7,999,514 | B2 | 8/2011 | Veselic et al. |
| 8,084,987 | B2 | 12/2011 | Hurtz |
| 8,097,354 | B2 | 1/2012 | Sakakibara |
| 8,148,941 | B2 | 4/2012 | Fiebig et al. |
| 8,159,185 | B2 | 4/2012 | Hayashi |
| 8,193,776 | B2 | 6/2012 | Bayne et al. |
| 8,253,559 | B2 | 8/2012 | Howard et al. |
| 8,258,751 | B2 | 9/2012 | Esnard |
| 8,286,723 | B2 | 10/2012 | Puzio et al. |
| 8,299,749 | B2 | 10/2012 | Becker et al. |
| 8,330,422 | B2 | 12/2012 | Bayne et al. |
| 8,330,426 | B2 | 12/2012 | Suzuki et al. |
| 8,426,051 | B2 | 4/2013 | Sakakibara |
| 8,436,584 | B2 | 5/2013 | Johnson et al. |
| 8,541,983 | B2 | 9/2013 | Veselic et al. |
| 8,638,071 | B2 | 1/2014 | Mizuno et al. |
| 8,758,919 | B2 | 6/2014 | Taga |
| 8,766,798 | B2 | 7/2014 | Howard et al. |
| 8,783,781 | B1 | 7/2014 | McClure et al. |
| 8,839,473 | B1 | 9/2014 | Catala |
| 8,884,756 | B2 | 11/2014 | Howard et al. |
| 8,885,307 | B2 | 11/2014 | Kobayakawa et al. |
| 8,919,456 | B2 | 12/2014 | Ng et al. |
| 8,922,164 | B2 | 12/2014 | Fiebig et al. |
| 8,970,164 | B2 | 3/2015 | Scheucher |
| 9,537,335 | B2 * | 1/2017 | Furui .................. B25F 5/02 |
| 2001/0017531 | A1 | 8/2001 | Sakakibara et al. |
| 2003/0011245 | A1 | 1/2003 | Fiebig |
| 2003/0090239 | A1 | 5/2003 | Sakakibara |
| 2003/0141844 | A1 | 7/2003 | Fiebig et al. |
| 2006/0087283 | A1 | 4/2006 | Phillips et al. |
| 2006/0226975 | A1 | 10/2006 | Keebler et al. |
| 2007/0096694 | A1 | 5/2007 | Barrella |
| 2009/0295570 | A1 | 12/2009 | Simon et al. |
| 2010/0019719 | A1 | 1/2010 | Okabayashi |
| 2010/0325807 | A1 | 12/2010 | Wu |
| 2012/0091823 | A1 | 4/2012 | Wu et al. |
| 2012/0166847 | A1 | 6/2012 | Noda et al. |
| 2012/0292070 | A1 | 11/2012 | Ito et al. |
| 2012/0304365 | A1 | 12/2012 | Howard et al. |
| 2012/0304367 | A1 | 12/2012 | Howard et al. |
| 2012/0306438 | A1 | 12/2012 | Howard et al. |
| 2012/0309300 | A1 | 12/2012 | Howard et al. |
| 2014/0042970 | A1 | 2/2014 | Grigoryants |
| 2014/0069672 | A1 | 3/2014 | Mashiko et al. |
| 2014/0107853 | A1 | 4/2014 | Ashinghurst et al. |
| 2014/0117922 | A1 * | 5/2014 | Pham .................. H02J 7/0027 320/103 |
| 2014/0151079 | A1 | 6/2014 | Furui et al. |
| 2014/0159662 | A1 | 6/2014 | Furui et al. |
| 2014/0159919 | A1 | 6/2014 | Furui et al. |
| 2014/0159920 | A1 | 6/2014 | Furui et al. |
| 2014/0183948 | A1 | 7/2014 | Hulbert et al. |
| 2014/0266000 | A1 | 9/2014 | Meoli |
| 2014/0269811 | A1 | 9/2014 | Maleki et al. |

(56) References Cited

U.S. PATENT DOCUMENTS

| | | |
|---|---|---|
| 2014/0364772 A1 | 12/2014 | Howard et al. |
| 2015/0110645 A1 | 4/2015 | Wu |
| 2015/0121620 A1 | 5/2015 | Aramli |
| 2015/0121621 A1 | 5/2015 | Aramli |
| 2015/0182033 A1 | 7/2015 | Brosnan et al. |

FOREIGN PATENT DOCUMENTS

| | | |
|---|---|---|
| CN | 202673616 | 1/2013 |
| CN | 203166596 U | 4/2013 |
| DE | 10348693 B4 | 5/2005 |
| DE | 202007010762 U1 | 10/2007 |
| DE | 102007035095 A1 | 1/2009 |
| DE | 202011005642 U1 | 9/2011 |
| DE | 102010029729 A1 | 12/2011 |
| DE | 202012001853 U1 | 3/2012 |
| DE | 102012220043 A1 | 5/2012 |
| DE | 102012218023 A1 | 10/2012 |
| DE | 102011121448 A1 | 6/2013 |
| DE | 102012202116 A1 | 8/2013 |
| DE | 102012112835 A1 | 6/2014 |
| DE | 102013208834 A1 | 11/2014 |
| DE | 102013212003 A1 | 1/2015 |
| DE | 102013216678 A1 | 2/2015 |
| EP | 1270150 B1 | 1/2003 |
| EP | 1902817 A2 | 3/2008 |
| EP | 2072192 A1 | 6/2009 |
| EP | 2104592 B1 | 9/2009 |
| EP | 2267863 A2 | 12/2010 |
| EP | 2477790 A1 | 7/2011 |
| EP | 2351182 B1 | 8/2011 |
| EP | 2429015 | 3/2012 |
| EP | 2617529 A2 | 7/2013 |
| EP | 2855100 A1 | 4/2015 |
| EP | 2864693 A | 4/2015 |
| JP | 2002-260611 | 9/2002 |
| JP | 2005-342796 | 12/2005 |
| WO | WO2008/049682 A1 | 5/2008 |
| WO | WO2008/065046 A1 | 6/2008 |
| WO | WO2009/000588 A1 | 12/2008 |
| WO | WO2014053048 A1 | 4/2014 |
| WO | WO2014062439 | 4/2014 |
| WO | WO2014/106140 A1 | 7/2014 |

OTHER PUBLICATIONS

EP search report dated May 25, 2016 for EP Application No. 16153954.9.

* cited by examiner

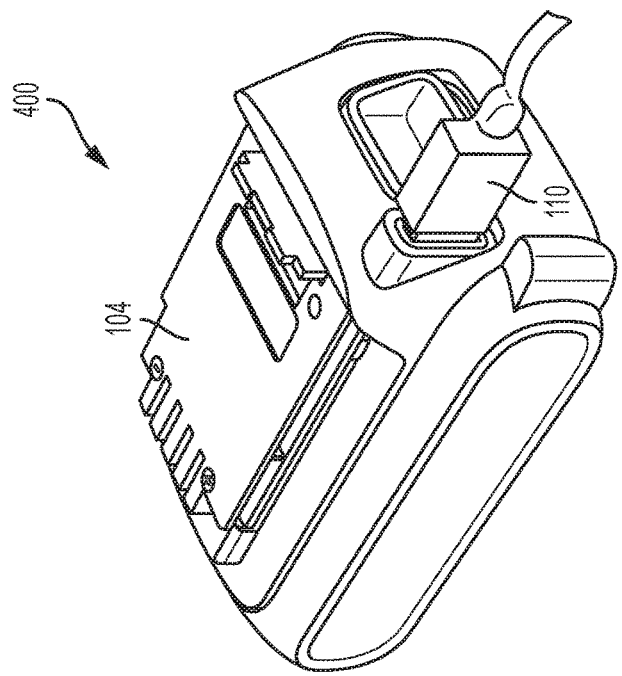
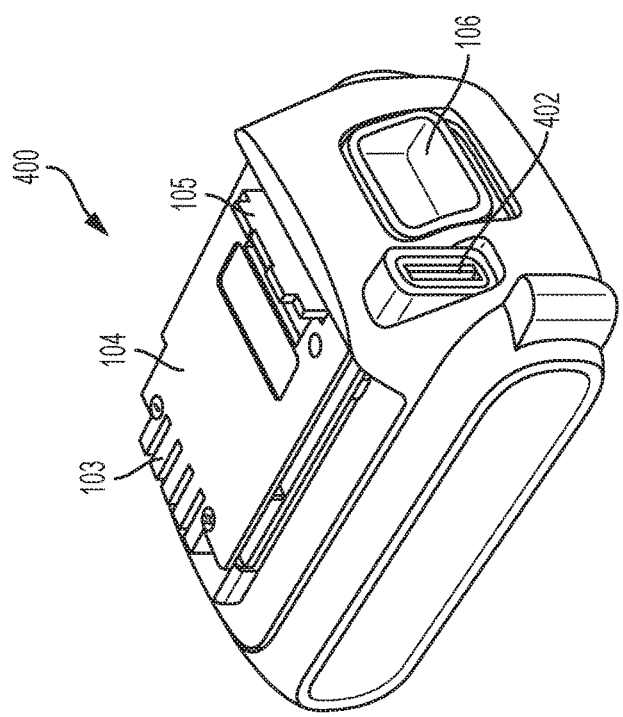

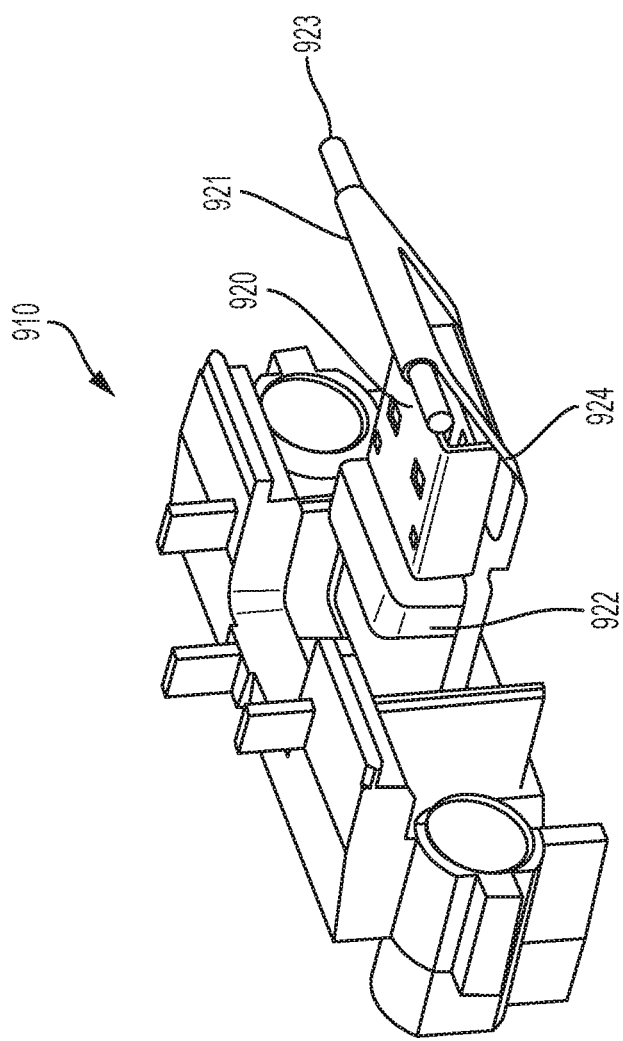

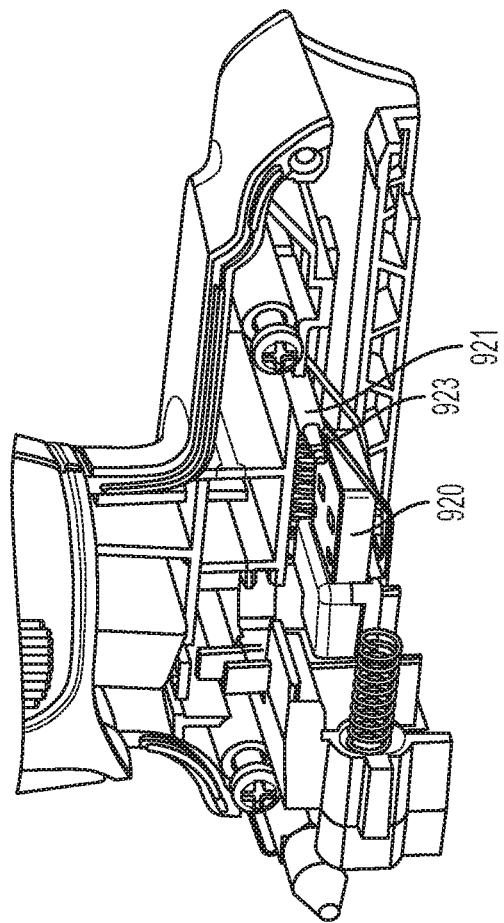

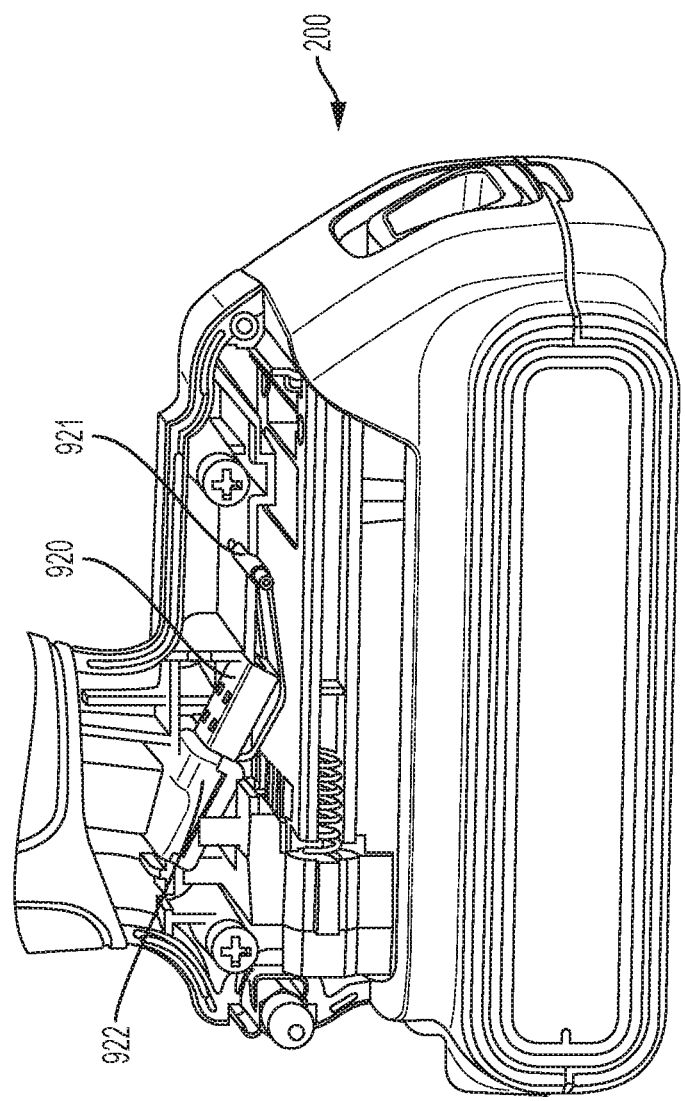

POWER TOOL WITH USB CONNECTION

CROSS-REFERENCE TO RELATED APPLICATIONS

This application claims the benefit of U.S. Provisional Application No. 62/110,773, filed on Feb. 2, 2015, entitled System for Enhancing Power Tools; and U.S. Provisional Application No. 62/132,149, filed on Mar. 12, 2015, entitled Power Tool USB Connection; and U.S. Provisional Application No. 62/132,245, filed on Mar. 12, 2015, entitled Power Tool Functionality; and U.S. Provisional Application No. 62/209,490, filed on Aug. 25, 2015, entitled Power Tool USB Connection; and U.S. Provisional Application No. 62/248,456, filed on Oct. 30, 2015, entitled Power Tool Functionality; and U.S. Provisional Application No. 62/251,956, filed on Nov. 6, 2015, entitled Power Tool Battery Pack and System. The entire disclosures of the above applications are incorporated herein by reference.

FIELD OF THE INVENTION

The present invention relates to a power tool battery pack, a power tool system and apparatus, systems and methods for providing power from a power tool battery pack.

BACKGROUND

Power tool battery packs are commonly used to power cordless power tools. Power tool battery packs are generally portable, include significant power and are owned by many professionals, tradesman and consumers who own other devices. Accordingly, it may also be desirable to provide for charging of the other/external devices by the power tool battery and it may be desirable to control the charging of an external device by a power tool battery.

SUMMARY

According to an aspect of the disclosure, in one exemplary embodiment there is a battery pack including a housing, at least one battery cell housed in the housing; a wireless transmitter housed in the housing; a button, the button configured to initiate pairing with an electronic device so that the battery pack may wirelessly communicate with the electronic device; a connection section including a first electrical connector configured to supply power to a power tool; and a charging port configured to supply power to an external device. The charging port can be in an on state in which the charging port is operable to supply power to the external device and an off state in which the charging port is not operable to supply power to the external device.

The charging port may be configured to change from the on state to the off state after a predetermined amount of time after charging from the charging port begins.

The predetermined amount of time may be equal or less than the watt-hour rating of the battery being charged divided by the voltage times the current out of the USB jack from the battery pack.

The predetermined amount of time may be ten hours or less.

The predetermined amount of time may be eight hours or less.

The predetermined amount of time may be seven hours or less.

The predetermined amount of time may be set by a user of the separate electronic device.

The predetermined amount of time that can be set by the user may have an upper limit.

The predetermined amount of time may be equal to or less than an Amp hour rating of the battery pack divided by a current drawn from the battery pack by the charging port.

The charging port may be a USB port.

According to another aspect, there is an exemplary embodiment of a power tool system which includes a power tool and a battery pack. The battery pack includes a housing, at least one battery cell housed in the housing; a wireless transmitter housed in the housing; a connection section including a first electrical connector configured to supply power to the power tool when the battery pack is connected to the power tool; and a charging port configured to supply power to an external device. The charging port can be in an on state in which the charging port is operable to supply power to the external device and an off state in which the charging port is not operable to supply power to the external device.

The charging port may be configured to change from the on state to the off state after a predetermined amount of time after charging from the charging port begins.

The predetermined amount of time may be ten hours or less.

The predetermined amount of time may be eight hours or less.

The predetermined amount of time may be seven hours or less.

The predetermined amount of time may be set by a user of the separate electronic device.

The predetermined amount of time set by the user may be limited.

The predetermined amount of time may be equal to or less than an Amp hour rating of the battery pack divided by a current drawn from the battery pack by the charging port.

The charging port may be a USB port.

The separate electronic device may include one of a computer, a tablet computer and a phone.

The power tool may be a drill.

According to another aspect, there is a power tool system which includes a plurality of power tools including a drill and at least one battery pack. The battery pack is selectively couplable to the plurality of power tools to provide electrical power to a coupled power tool to which the battery pack is coupled. The battery pack includes a housing, at least one battery cell housed in the housing; a wireless transmitter housed in the housing; a connection section including a first electrical connector configured to supply power to the coupled power tool and a charging port configured to supply power to an external device. The charging port can be in an on state in which the charging port is operable to supply power to the external device and an off state in which the charging port is not operable to supply power to the external device.

The charging port may be configured to change from the on state to the off state after a predetermined amount of time after charging from the charging port begins.

The predetermined amount of time may be set by a user of the separate electronic device.

The predetermined amount of time is equal to or less than an Amp hour rating of the battery pack divided by a current drawn from the battery pack by the charging port.

BRIEF DESCRIPTION OF THE DRAWINGS

FIG. 4A illustrates another exemplary embodiment of a battery pack;

FIG. 4B illustrates the exemplary embodiment of the battery pack of FIG. 4A with a USB cord;

FIGS. 9A to 9C illustrate movement of a connector according to the exemplary embodiment of FIGS. 8A and 8B;

FIGS. 10A and 10B illustrate movement of a connector according to the exemplary embodiment of FIGS. 8A and 8B;

DESCRIPTION OF EXEMPLARY EMBODIMENTS

FIGS. 1A-6 illustrate exemplary embodiments of a battery pack. These battery packs may be coupled with and used to power a variety of power tools, including tools such as drills, circular saws, reciprocating saws, jigsaws, miter saws, table saws and outdoor power tools such as string trimmers and hedge trimmers.

Figure 1A:
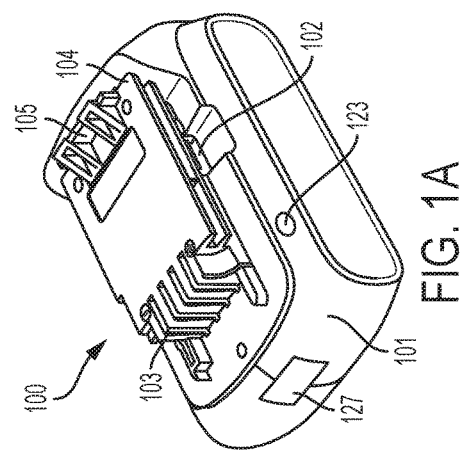
FIG. 1A illustrates an exemplary embodiment of a battery pack.
Figure 1B:
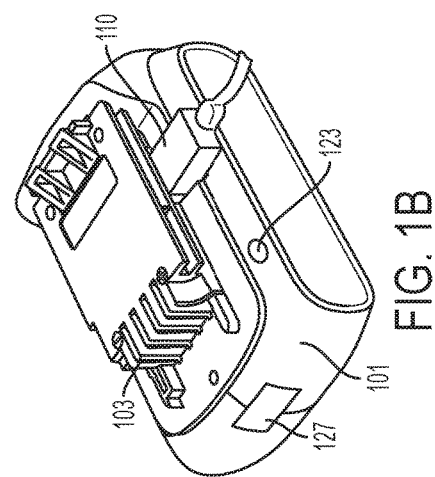
FIG. 1B illustrates an exemplary embodiment of a battery pack and USB cord.

FIG. 1A illustrates a first exemplary embodiment of a power tool battery pack 100. The power tool battery pack 100 includes a set of rechargeable battery cells 120 (FIG. 5) disposed in a housing 101. The housing includes guide rails 104 for connecting with a power tool and a latch 105 for securing the battery to the power tool. The latch 105 can be moved by depression of the latch actuator 106 (shown in FIGS. 4B), which may be integral with the latch 105. A battery pack with guide rails such as those shown in FIG. 1A is more fully shown and described in U.S. Pat. No. 6,729,413 which is incorporated herein by reference.

Figure 5:
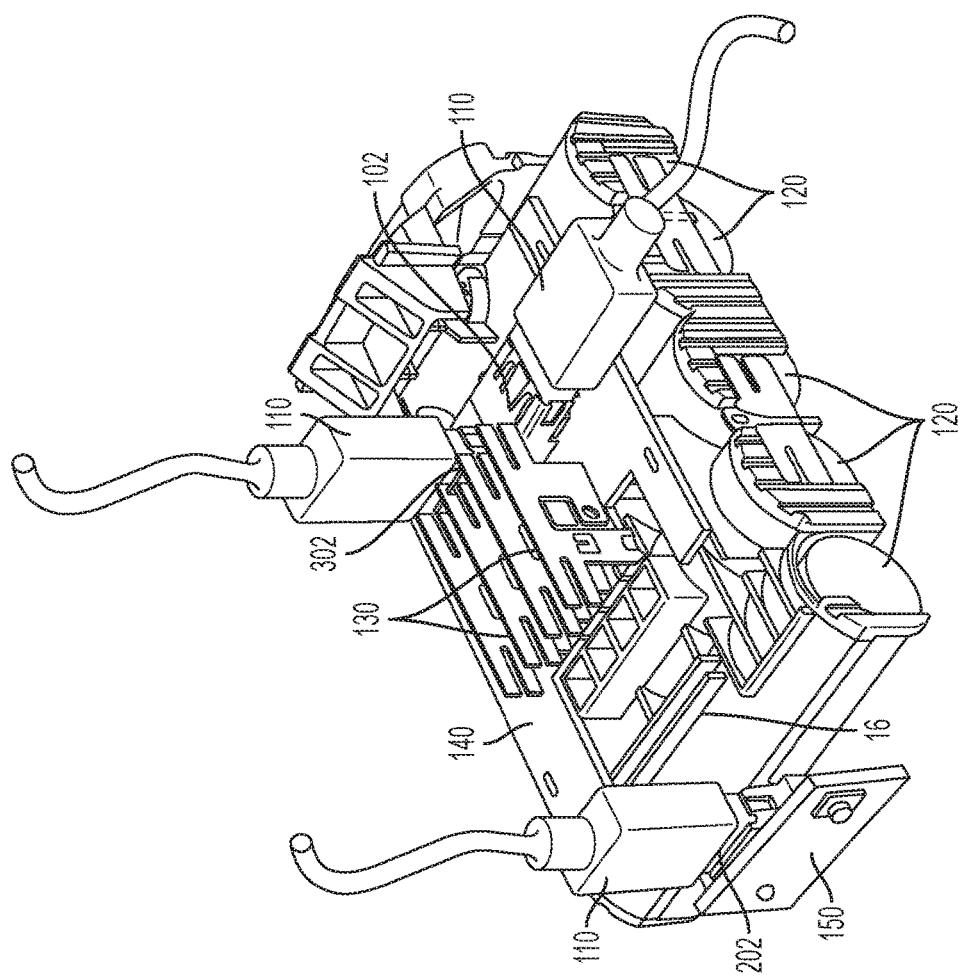
FIG. 5 illustrates exemplary embodiments of a battery pack and USB cords with, a housing of the battery pack removed.
Figure 13:
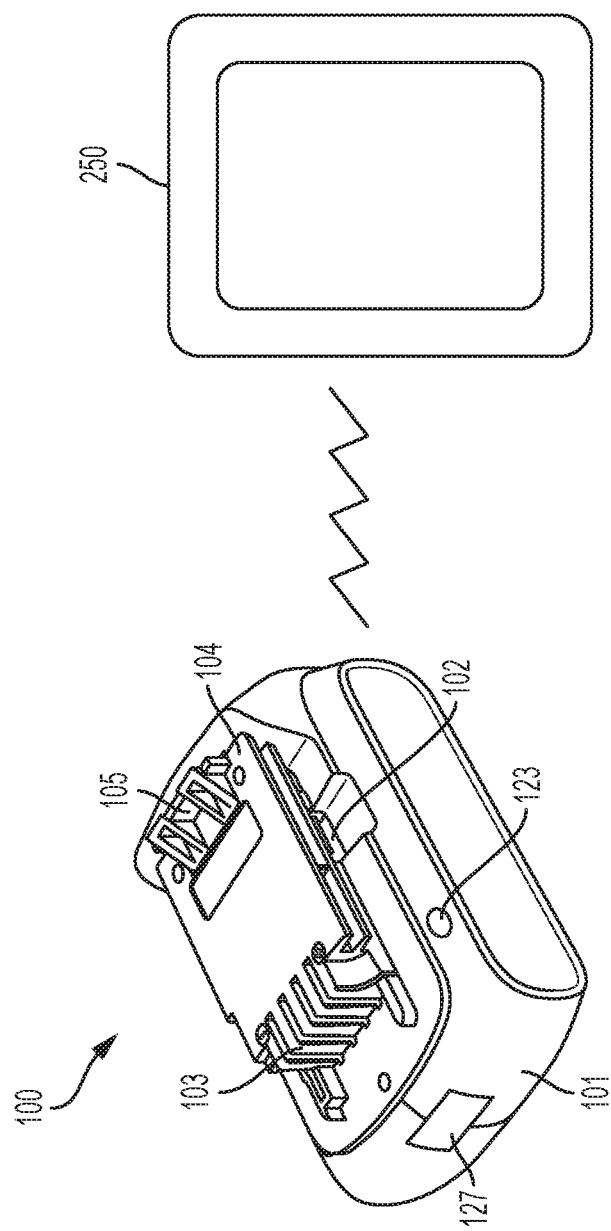
FIG. 13 illustrates an exemplary embodiment of a battery pack and a computing device for communicating with the battery pack.

The power tool battery pack 100 can be connected to a power tool to provide electrical power to the power tool through a connection section 103 through which electrical connectors 130 (FIG. 5) can be accessed. Additionally, battery pack 100 includes a charging connector or port 102. In the exemplary embodiment, the charging connector is a USB port which receives a USB cord 110. Other types of charging connectors could alternatively be used. The charging connector 102 allows the battery pack 100 to charge or power batteries and devices other than those with which it is designed to mate with through the connection section 103 (i.e., external devices). For example, the battery pack 100 may be connected to a cell phone through the USB cord 100 in order to allow the battery pack 100 to charge the cell phone. The configuration shown in FIGS. 1A and 1B allow the USB port 102 to be mounted on a main PCB board (as shown in FIG. 5). Also, placement of the charging port 102 below the guide rails of the battery pack 100 allow it to be protected from dust and other debris by the rails. The battery pack 100 includes a pairing button 127 which activates a pairing function of the battery pack, which allows the battery pack 100 to be paired with an computing device 250 (FIG. 13). It additionally includes a charging port button 123, which enables and disables the charging port 102.

Figure 2A:
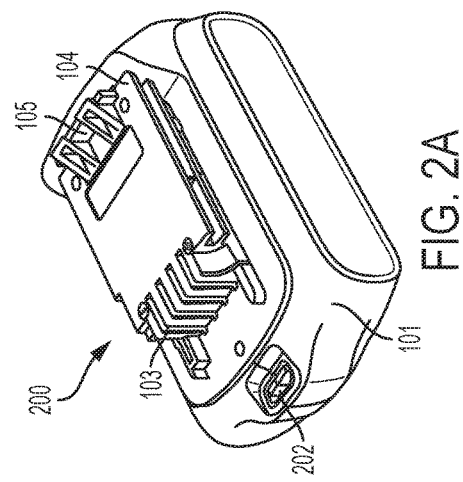
FIG. 2A illustrates another exemplary embodiment of a battery pack.
Figure 2B:
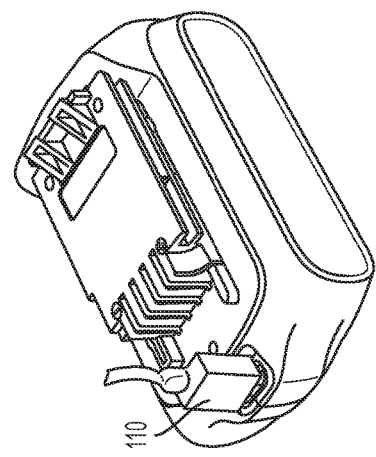
FIG. 2B illustrates the exemplary embodiment of the battery pack of FIG. 2A with a USB cord.

FIGS. 2A and 2B show another exemplary embodiment of a battery pack 200. The battery pack 200 is the same as battery pack 100 unless otherwise discussed or shown. In the case of battery pack 200, the charging port 202 is located at a back of the battery. This provides a highly visible location for the user. Additionally, it allows for the battery pack 200 to be connected with a power tool at the same time the battery pack 200 is connected to another device through the charging port 202 via a USB cord 110.

Figure 3A:
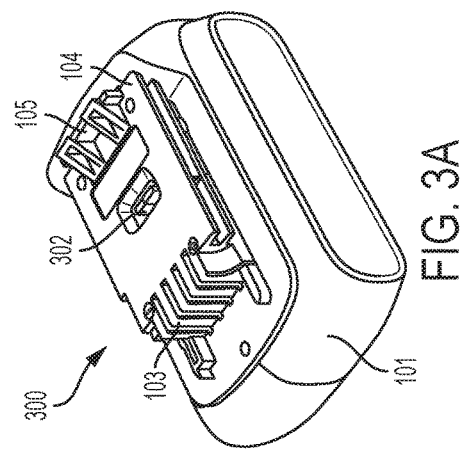
FIG. 3A illustrates another exemplary embodiment of a battery pack.
Figure 3B:
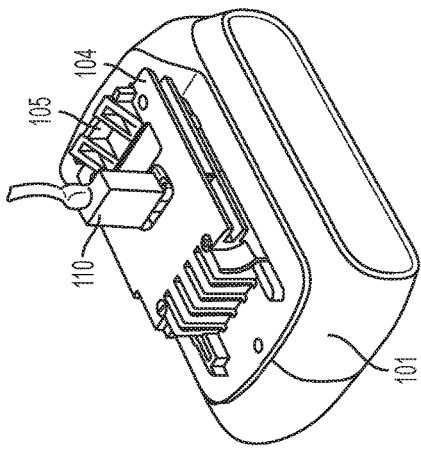
FIG. 3B illustrates the exemplary embodiment of the battery pack of FIG. 3A with a USB cord.

FIGS. 3A and 3B show another exemplary embodiment of a battery pack 300. The battery pack 300 is the same as battery pack 100 unless otherwise discussed or shown. In the case of battery pack 300, the charging port 302 is located at a top of the battery pack 300. This configuration allows the charging port 302 to be protected from debris when the battery pack 300 is coupled to a power tool.

FIGS. 4A and 4B show another exemplary embodiment of a battery pack 400. The battery pack 400 is the same as battery pack 100 unless otherwise discussed or shown. In the case of battery pack 400, the charging port 402 is located at a front of the battery pack 300. This provides a highly visible location for the user. Additionally, it allows for the battery pack 400 to be connected with a power tool at the same time the battery pack 400 is connected to an external device through the charging port 402 via a USB cord 110.

FIG. 5 is an illustrative drawing showing an inside of a battery pack, such as those previously discussed 100, 200, 300, 400. As shown, the pack includes a plurality of rechargeable battery cells 120. A cradle 16 sits over the battery cells 120 and a printed circuit board (PCB) 140 is connected to the cradle 16. Electrical connectors 130 are mounted on the PCB 140 and, as previously discussed, connect with power tools through the connection section 103. A battery pack of this general construction is shown and described in more detail in WO 2014/062439, which is incorporated herein by reference.

The illustrative drawing of FIG. 5 includes an illustration of charging ports 102, 202 and 302, corresponding to the locations shown in FIGS. 1A-3B. As shown in FIG. 5, charging ports 102 and 302 may be mounted on the main PCB 140. Alternatively or additionally, a second PCB 150 may be added to accommodate, such as the illustrated charging port 202.

Figure 6:
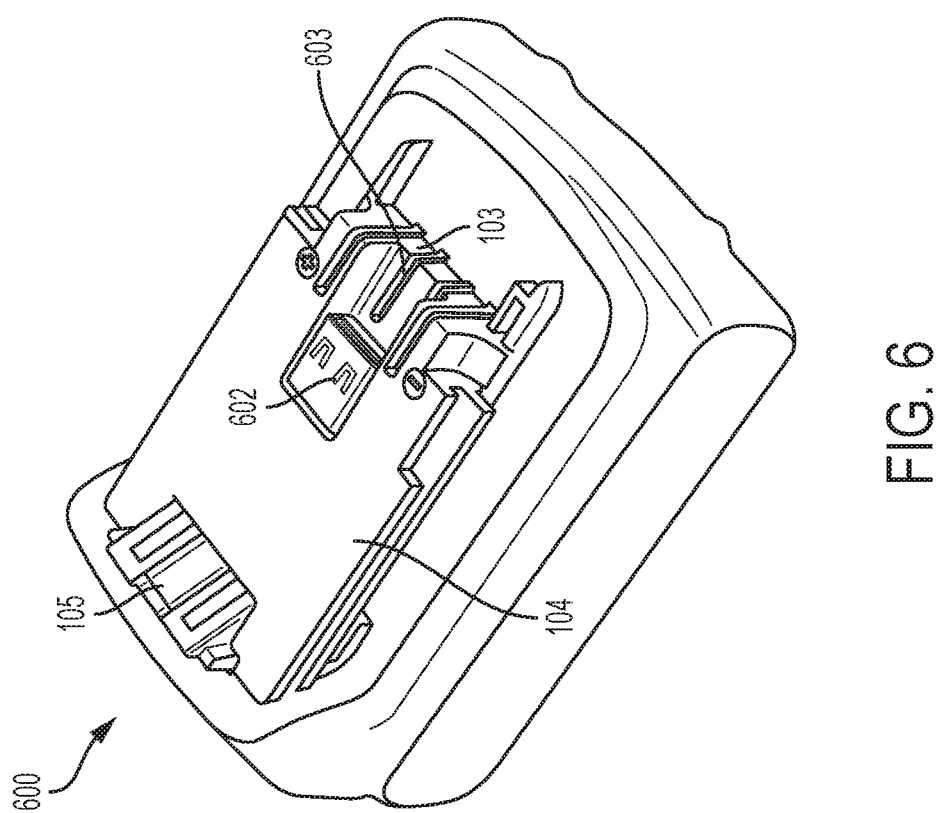
FIG. 6 illustrates another exemplary embodiment of a battery pack.

FIG. 6 shows another exemplary embodiment of a power tool battery pack 600. The battery pack 600 is the same as battery pack 100 unless otherwise discussed or shown. As illustrated in FIG. 6, a port 602 is disposed in a recess 603 in the connection section 103. The port 602 in this exemplary embodiment is a data port and a charging port. Ports in this or any of the exemplary embodiments may be both a data port and a charging port, a dedicated data port or a dedicated charging port.

Figure 7B:
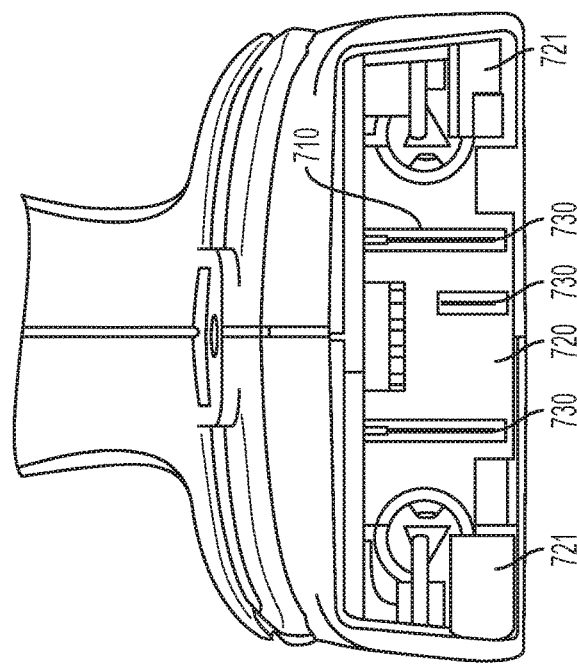
FIGS. 7A and 7B illustrate an exemplary embodiment of a power tool connection section.
Figure 7A:
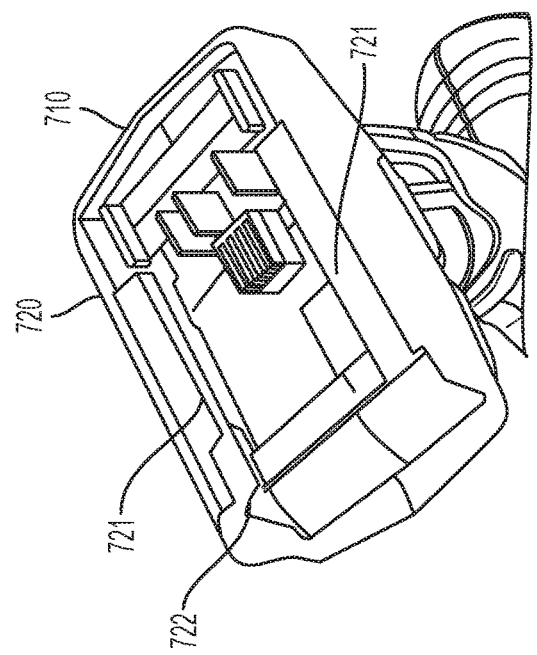

FIGS. 7A and 7B illustrate a connection section of a power tool 700. In this case, the power tool is a drill. The connection section is configured to receive the battery pack 600 and includes a connector assembly 710. Electrical connectors 130 of the battery pack engage with electrical connectors 730 of the power tool to provide power for operation of the power tool. Rails 104 of the battery pack 600 slide on rails 721 of the power tool 721 to guide and hold the battery pack 600 and latch 105 engaged with latch receiver 722 to latch the battery pack 600 in place. Additionally, the power tool 700 includes a connector 720 to engage with port 602. This allows the power tool 700 to communicate with the battery pack 600.

In this case, the battery pack 600 may include a wireless transmitter, as discussed in U.S. Patent Application Publication No. 2014/0107853, which is hereby incorporated by reference. Additionally, the drill 700 may include a microprocessor which measures characteristics of the power tool, such as is shown in U.S. Pat. No. 8,919,456, which is hereby incorporated by reference. In this case, information from the drill 700 may be communicated to the battery pack 600 via the connection of port 602 and connector 720. For example, information regarding motor current, motor speed (e.g., revolutions per minute—RPM) or temperature of the motor may be communicated to the computing device (such as a cellular phone, tablet or computer) via the wireless transmitter/receiver in the battery pack 600. The computing device can then display the information. The power tool 700 may alternatively or additionally include the features described in U.S. Pat. No. 8,286,723, which is hereby incorporated by reference. As shown in FIG. 7, the power tool described in U.S. Pat. No. 8,286,723 includes a controller as well as a rotational rate sensor, H-Bridge temperature sensor, current sensor and a tachometer. When using battery pack 600 information from the rotational rate sensor, H-Bridge temperature sensor, current sensor, tachometer or other information known or collected by the controller can be transmitted to the external electronic device for display to a user.

Similarly, information from computing device, may be received by the battery pack 600 and conveyed to the drill through the connection of port 602 and connector 720. For example, a user may input information regarding a maximum speed, current, etc. onto an computing device which can then be transmitted to the battery pack 600 via the wireless transmitter/receiver and related to the microprocessor on the drill 700. Alternatively or additionally, the a user may instruct the power tool to select one of the control curves shown in FIGS. 9A-9E of U.S. Pat. No. 8,286,723.

As can be appreciated, when the drill 700 includes connector 720 that is fixed, the fixed connector 720 would block insertion of a battery pack that lacks a recess 603. Accordingly, while the battery pack 600 may be inserted into the drill 700 with a fixed connector 720, the other exemplary embodiments, such as 100, 200, 300 and 400, cannot. In this manner, the connector 720 may serve as a lock-out. In the exemplary embodiment shown in FIGS. 6, 7A and 7B, the battery pack 600 has a female connector and the tool has a male connector. This can be reversed so that the battery pack would have a male connector and the tool have a male connector.

Figure 8A:
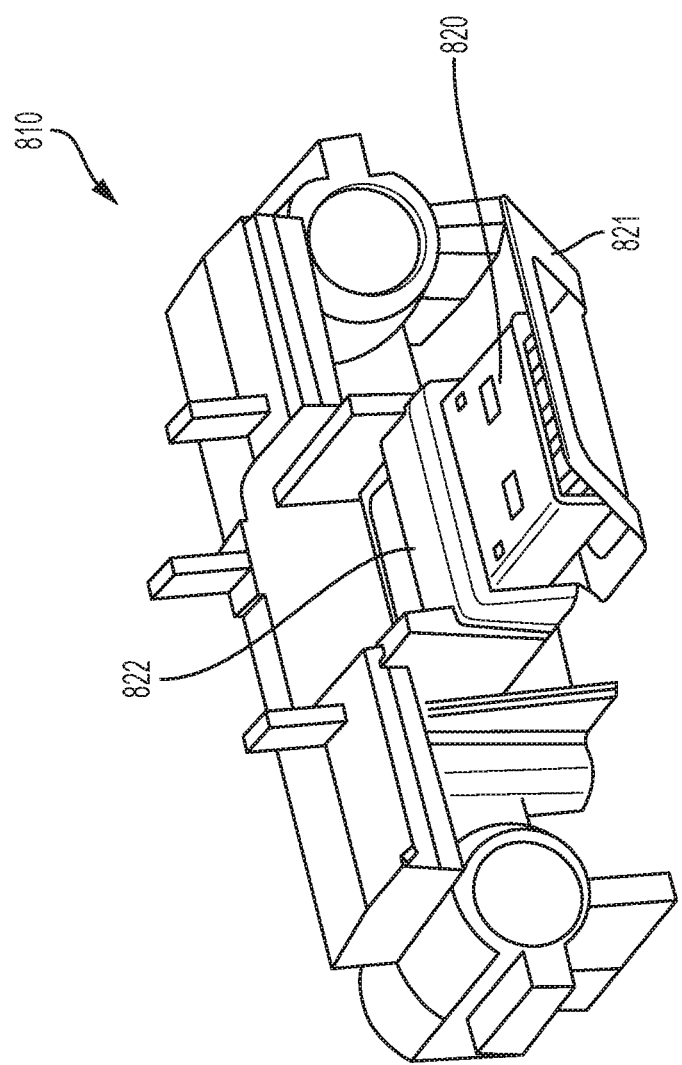
FIGS. 8A and 8B illustrate an exemplary embodiment of a power tool connection section.
Figure 8B:
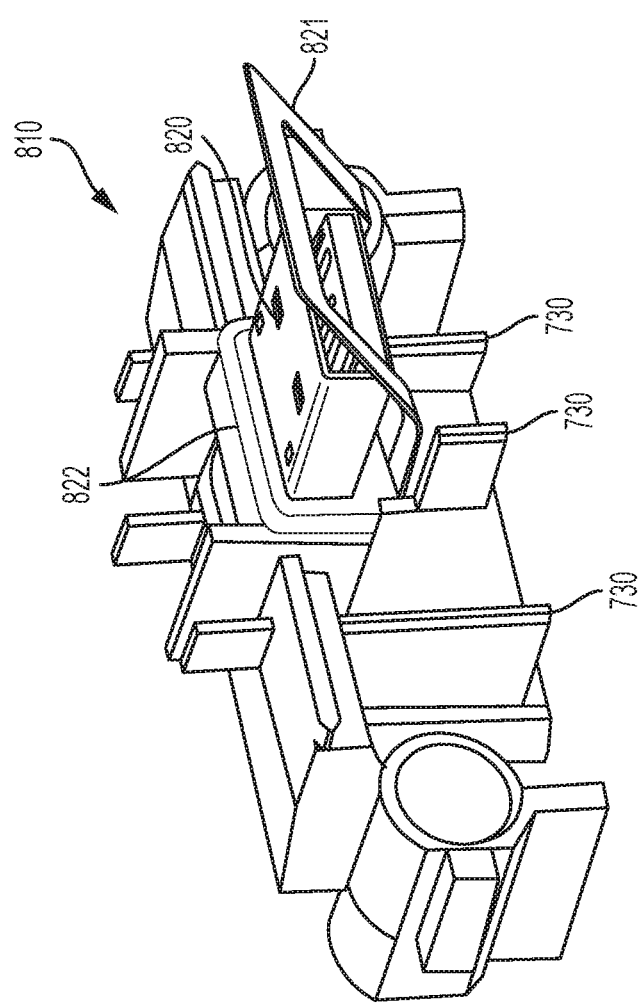

In an alternative embodiment shown in FIGS. 8A and 8B, there is an alternative connection assembly 810 in which the connector 820 is moveable. The connection section is otherwise the same as that described above with respect to FIGS. 7A and 7B unless otherwise noted. The connection assembly of FIGS. 8A and 8B include a connector 820 attached to a connector base 822 and a cam 821. In the position of FIG. 8A, a battery pack with a mating connector can engage the connector 820 to provide communication between the power tool and the battery pack. The battery pack in that instance would have a recess sized and shaped to receive the cam 821. This would allow a battery pack with a data connector to connect to the connector 820 without moving the connector 820 by engaging the cam.

FIG. 8B illustrates the connector 820 in a position in which it has been moved out of the way by a battery pack without a data connector or cut-out to receive cam 821. Particularly, when battery packs such as battery packs 100, 200 and 300 shown in FIGS. 1A-3B are utilized with the connection assembly 810, the connection section 103 of those battery packs contacts the cam 821 and pushes the cam 821 and the base 822 and connector 820 to which it is connected upwards to the position of FIG. 8B so that they are out of the way of the battery pack 100, 200 300. The base 822 may be biased by a spring towards the position shown in FIG. 8A.

As can be appreciated, with a connector 820 as shown in FIGS. 8A and 8B, the power tool 700 can mate with either a battery pack with a data connector or with a battery pack without a data connector. When the battery pack has a compatible data connector, it will engage the connector 820 and when the battery pack lacks such a connector, it can be designed to move the connector 820 out of the way.

Figure 9B:
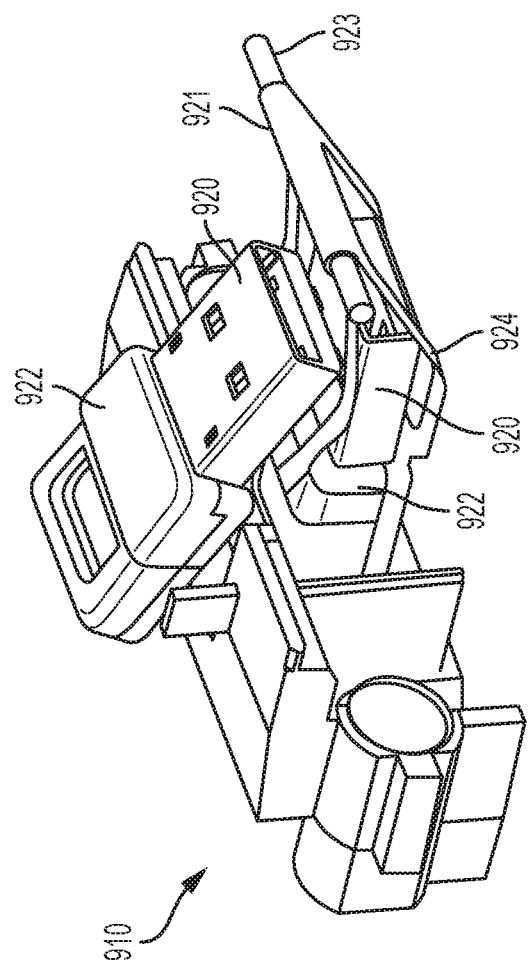
Figure 9C:
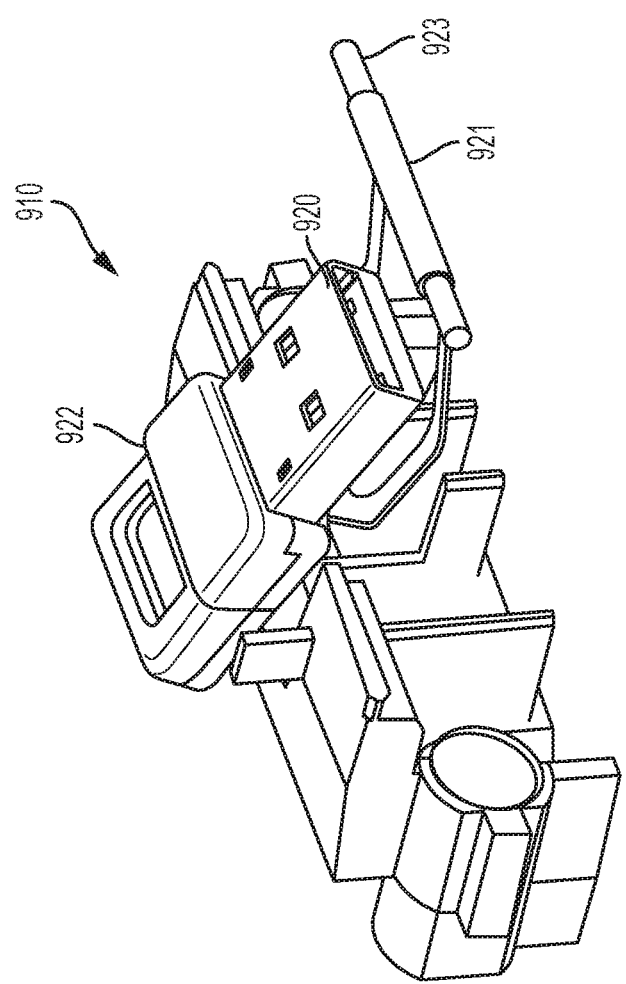

The exemplary embodiment of FIGS. 8A and 8B show a connector 820 which may be translated in an upward direction. In alternative embodiments, the connector 820 may be moved in other directions or motions. For example, another exemplary embodiment is shown in FIGS. 9A-10B. As shown in these figures, the connection section 910 includes a connector 920 that is connected to a cam member 921 which includes a pivot 923 about which the cam member 921 rotates. Accordingly, when a battery pack without a complementary connection is used with this embodiment, the battery pack hits cam arms 924 to rotate the connector 920 and base 922 around the pivot 923. FIG. 9A shows the connector 920 and base 922 in an initial position where it is ready to connect with a battery pack including a data connector. FIG. 9A is analogous to FIG. 8A, described above. FIG. 9C shows the connector 920 and base 922 in a position where it is rotated out of the way to allow engagement of a battery pack without a data connector. FIG. 9C is analogous to FIG. 8B, described above. FIG. 9B is an illustrative drawing showing the connector 920 and base 922 in both positions to aid in illustrating the movement of the connector 920 and base 922 between the two positions. The connector 920 and base 922 may be biased towards the position in FIG. 9A or the position in FIG. 9C. FIGS. 10A and 10B illustrate the connection section 910 of FIGS. 9A-9C in a power tool. As shown in FIG. 10B, when a battery pack such as battery packs 100, 200 or 300 is inserted into the power tool 700 and lacks a recess for the cam arms 923, the connector 920 and base 922 are pushed out of the way to allow the pack to be engaged with the power tool without interference from the connector 920 or base 922.

Figure 11:
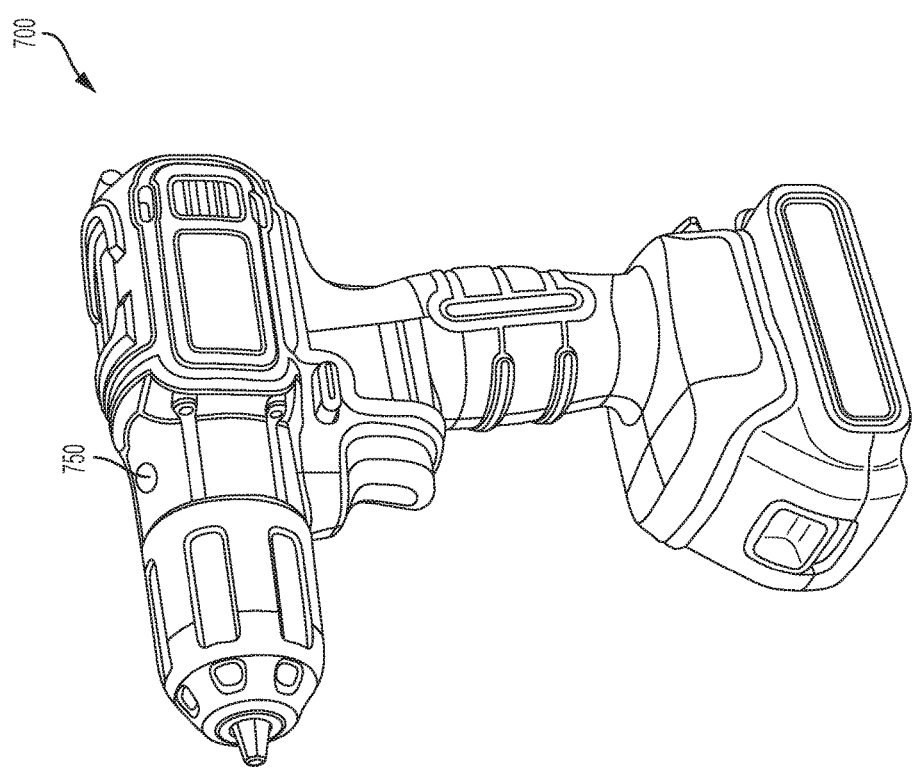
FIG. 11 illustrates an exemplary embodiment of a power tool with a battery pack attached.

FIG. 11 illustrates a power tool 700 with a battery pack attached. The power tool 700 includes an indicator light 750 which indicates the type of battery pack connected to the power tool. For example, the indicator 750 may light up when the power tool 700 is connected to a battery pack and includes data communication with the battery pack. Alternatively or additionally, the indicator 750 may be lit when the power tool 700 is connected to a battery pack which includes a wireless transceiver. The indicator 750 may be a light which is selectively lit or unlit. It may also include a light which illuminates or spells out a word, such as "DATA" or "WIRELESS" or provides some other indication to a user of the power tool 700.

Figure 12:
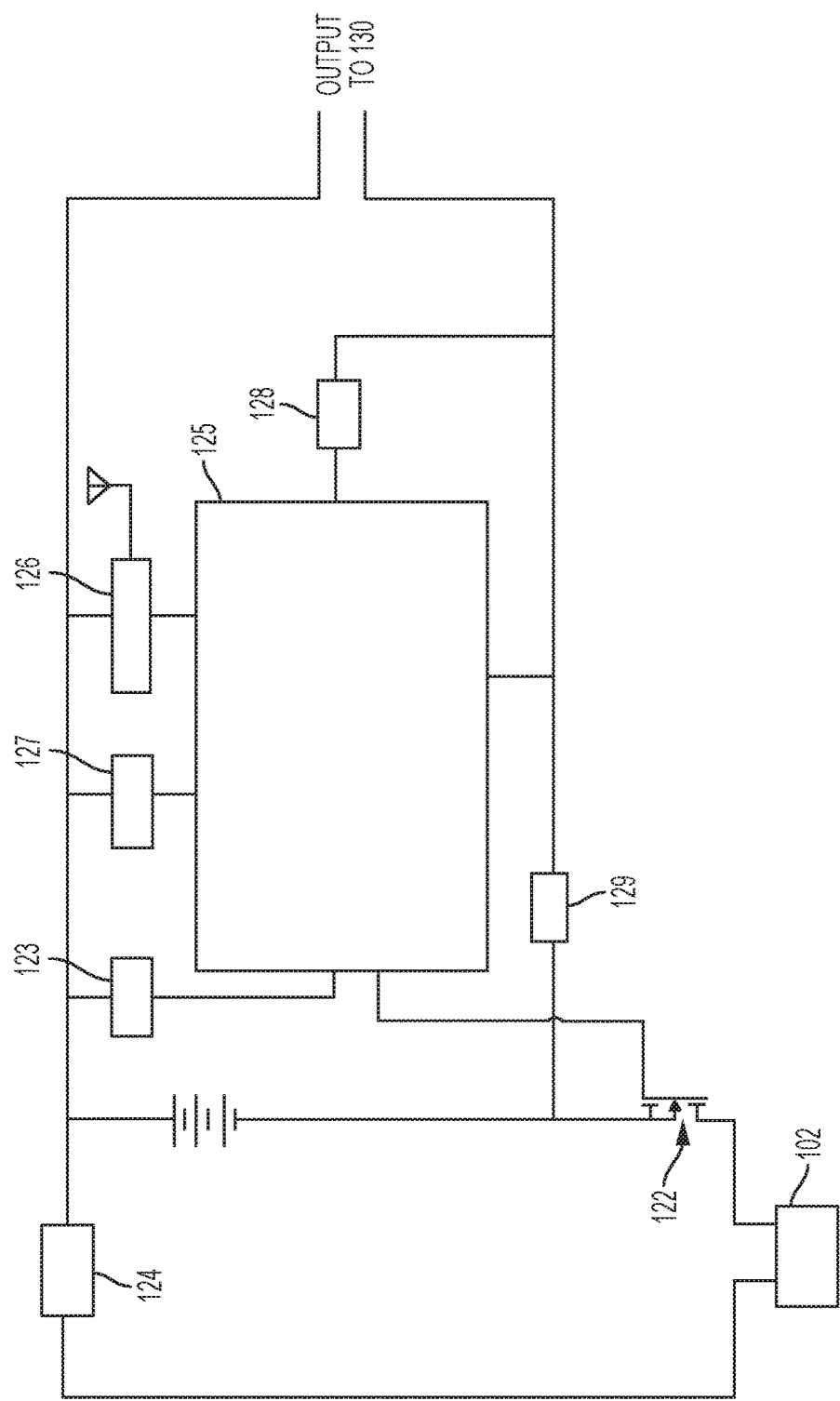
FIG. 12 illustrates an exemplary embodiment of a circuit diagram for a battery pack according to one of the exemplary embodiments of the power tool battery pack.
Figure 14:
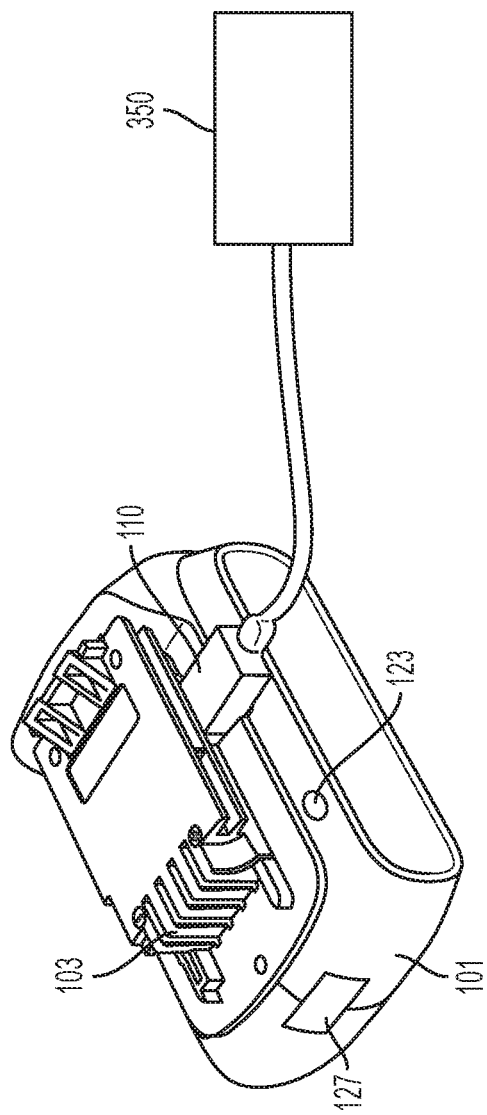
FIG. 14 illustrates an exemplary embodiment of a battery pack charging an external device.

FIG. 12 is a simplified electrical diagram of an internal configuration of one of the battery packs and FIG. 13 is an illustration of a computing device and battery pack. FIG. 14 illustrates the battery pack charging an external device. In the embodiments of FIGS. 12, 13 and 14, the battery pack 100 is used as an exemplary battery pack. However, the features illustrated therein can be used with any of the battery packs described herein.

As shown in FIG. 12, the packs include cells 120 which provide power to the power tool through electrical connectors 130 and/or to an external device to be charged through a voltage regulator 124 connected to a charging port 102. In this exemplary embodiment, the charging port is a USB port 102. The pack includes a microcontroller 125, a wireless communicator 126, a memory 128 and a current sensor 129. As discussed previously, the battery pack includes a PCB 140 and the components may be mounted on the PCB 140. If the battery pack includes second PCB 150, one or more of the components may be mounted on that PCB 150.

As shown in FIG. 12, the microcrontroller 125 is connected to a MOSFET switch 122 of the USB Port 102. The microcontroller 125 can control the switch 122 to enable and disable the USB Port 102. The wireless communicator 126 is operable to communicate with external computing devices, such as computing device 250 shown in FIG. 13. As is well known in the art, computing device 250 itself includes wireless communication capabilities and provide commands, data or other information to the battery pack 100 through the wireless communicator 126 and the microcontroller 125 may control the battery pack 100 accordingly.

As discussed above, the battery pack 100 includes a pairing button 127. When the user depresses the pairing button 127 a pairing sequence is initiated which can pair the battery pack 100 with the computing device 250 as is known in the art. In the exemplary embodiment, wireless communication may take place according to Bluetooth standards, but other wireless communication is also contemplated as part of this disclosure.

In one exemplary embodiment, the USB Port 102 may be disabled via the switch 122 after a pre-determined amount of time. For example, the USB Port 102 may be turned on by a user-actuable switch. This user actuable switch may be the pairing switch 127. Additionally or alternatively, it may be a separate charging port button 123. User actuation of the switch 127 or 123 will enable the USB Port 102 by toggling the MOSFET switch 122. The USB Port 102 will then be enabled to charge an external device 350 for a predetermined amount of time. After the predetermined amount of time elapses, the microcontroller 125 can toggle the MOSFET switch 122 to disable the USB Port 102. This prevents the battery cells 120 from becoming drained or having an undervoltage situation. In exemplary embodiments of the invention, the predetermined amount of time may be 10 hours or less; 9 hours or less; 8 hours or less; 7 hours or less; or 6 hours or less. The predetermined amount of time may be determined in a variety of ways. A predetermined amount of time of 8 hours or less provides significant charging to an external device 350 while avoiding an undervoltage situation. The external device 350 may be any number of devices which needs electrical charge. For example, these could include a phone, laptop computer, tablet computer, lights, batteries and the like. It could also charge a screwdriver that includes the appropriate input, such as Black & Decker cordless screwdriver BDCS30C.

Additionally or alternatively to being activated by pairing switch 127 or charging port switch 123, the USB port 102 may be activated by the external computing device 250. A user of the computing device 250 can enter a command to turn on the USB port 102. The command is received through the wireless communicator 126 and the microcontroller 125 can toggle the MOSFET switch 122 to enable the USB port 102. The USB port 102 can then remain enabled for a predetermined amount of time, as discussed above.

The computing device 250 may also be used to program the predetermined amount of time. For example, rather than having an automatic predetermined amount of time such as 6 hours, the computing device 250 may be used to set a predetermined amount of time. The set time may be chosen from a selection of specific choices. For example, a user may be given a select number of choices and be able to select a predetermined amount of time as 2 hours, 3 hours, 4 hours, 5 hours, 6 hours or 7 hours. The user may also be able to input any selection for the predetermined amount of time.

In some instances it may be useful to have a maximum limit to the predetermined amount of time a user may input. For example, the user may be able to input any predetermined amount of time up to a maximum limit of 6 hours. The maximum limit can thus ensure that an undervoltage or other over-drainage of the battery cells 120 is avoided. The maximum limit may be, for example, 10 hours, 9 hours, 8 hours, 7 hours, 6 hours, 5 hours, 4 hours, 3 hours or 2 hours. In any of the embodiments, the amount of time remaining before the USB port 102 is disabled may be displayed on the computing device 250. U.S. Patent Application Publication No. 2014/0107853 and U.S. provisional application No. 62/132,245 disclose computing devices which display the charging of a battery pack. U.S. provisional application No. 62/132,245 is hereby incorporated by reference in its entirety. The features of those applications may be incorporated into the present system. For example, the computing device 250 of the present application may display both the state of charge of the battery pack 100 and the amount of time remaining before the charging port 102 is disabled. This can be done simultaneously or a user may toggle between the displaying the amount of time remaining and the state of charge.

In one exemplary embodiment, it the predetermined amount of time may be determined according to the amp-hour rating of the battery pack and the current drawn from the battery pack by the voltage regulator 124. The predetermined amount of time or the maximum limit may be set at a value equal to or greater than the watt-hour rating of a battery of the external device 350 being charged divided by the current times the voltage of the USB port 102. This may be, for example, 2 hours or greater; 3 hours or greater; or 4 hours or greater.

In another exemplary embodiment, the predetermined amount of time or maximum limit of the predetermined amount of time may be equal to or less than a wattage of the battery pack 100 divided by a power consumption of the voltage regulator 124. As with an above example, this can prevent undervoltage or overdraining of the battery cells 120 of the battery pack 100. The predetermined amount of time or maximum limit of the predetermined amount of time may also be set slightly higher. For example, it may be set equal to or less than 1.2 times; 1.3 times or 1.4 times a wattage of the battery pack 100 divided by a power consumption of the voltage regulator 124. In one example, the battery pack 100 has a maximum initial voltage of 20V and an amp-hour rating of 1.5 Amp-hours (Ah). In an example, the voltage regulator draws 300 mA of current and receives the 20V input voltage. The battery pack 100 wattage is the battery pack 100 voltage (i.e., 20V) multiplied by the battery pack amp hour rating (1.5 Ah). Accordingly, a wattage of the battery pack 100 divided by a power consumption of the voltage regulator 124 is equal to 5 hours. The predetermined amount of time or maximum limit of the predetermined amount of time may thus be set at 5 hours or less. It may also be set at something higher such as 6 hours or less (1.2×); 6½ hours or less (1.3×) or 7 hours or less (1.4×).

The computing device 250 may also be used to set the amount of current drawn from the voltage regulator 124. For example, the electronic device may be configured to allow a user to set the current drawn from the voltage regulator 124 to 300 mA, 400 mA, 500 mA or some other setting. The computing device 250 may be configured to allow the user to set the charging rate for the USB port 102. For example, the user may be able to set the USB port 102 so that it charges with a 1 A current. Other rates may also be set, for example, it may set a rate that is 2 A or less; 1.5 A or less; 1 A or less or 500 mA or less.

The USB port 102 may also be disabled by simply pressing the user actuable button 123 and/or 127 a second time. In one embodiment, depressing the button may override the predetermined time. For example, if the USB port 102 is set to charge for a predetermined time of 6 hours, the USB port 102 may stay enabled for 6 hours or until a user actuates one of the buttons (123 and/or 127, as appropriate according to the embodiment) to disable the USB port 102. Similarly, a user may use the computing device 250 to disable the USB port 102 before the predetermined time elapses.

Depending upon the type of charging port 102, the voltage at which charging is done at the charging port 102 is done may be modified by modifying the voltage regulator 124. For example, the user may set the charging voltage to 3V, 5V, 10V, 12V, or 20V.

The battery pack may also be modified to include multiple charging ports 102. The multiple charging ports 102 may all be controlled independently by separate voltage regulators. For example, if a battery pack has two charging ports, one may be controlled by the user through the computing device 250 so that it charges at a first current and first voltage and the second charging port may be set by the user to charge at a second current and second voltage.

Various different embodiments have been described above. It is contemplated that the features of various embodiments can be combined into a single embodiment.

The description of the invention is merely exemplary in nature and, thus, variations that do not depart from the gist of the invention are intended to be within the scope of the invention. Such variations are not to be regarded as a departure from the scope of the invention.

What is claimed is:

1. A battery pack comprising:
   a housing,
   at least one battery cell housed in the housing;
   a wireless transmitter housed in the housing;
   a button, the button configured to initiate pairing with an electronic device so that the battery pack may wirelessly communicate with the electronic device through the wireless transmitter;
   a connection section including a first electrical connector configured to supply power to a power tool; and
   a charging port configured to supply power to an external device;
   wherein the charging port can be in an on state in which the charging port is operable to supply power to the external device and an off state in which the charging port is not operable to supply power to the external device.

2. The battery pack of claim 1, wherein the charging port is configured to change from the on state to the off state when a predetermined amount of time elapses after charging from the charging port begins.

3. The battery pack of claim 2, wherein the predetermined amount of time is ten hours or less.

4. The battery pack of claim 2, wherein the predetermined amount of time is eight hours or less.

5. The battery pack of claim 1, wherein the charging port is configured to be turned into the on-state by at least one of a user input from the electronic device and activating the button.

6. The battery pack of claim 2, wherein the predetermined amount of time is set by a user of the separate electronic device.

7. The battery pack of claim 6, wherein the predetermined amount of time that can be set by the user has an upper limit.

8. The battery pack of claim 2, wherein the predetermined amount of time is equal to or less than an Amp hour rating of the battery pack divided by a current drawn from the battery pack by the charging port.

9. The battery pack of claim 1, wherein the charging port is a USB port.

10. A power tool system comprising:
    a power tool; and
    a battery pack, the battery pack comprising:
    a housing,
    at least one battery cell housed in the housing;
    a wireless transmitter housed in the housing and configured to wirelessly communicate with an electronic device;
    a connection section including a first electrical connector configured to supply power to the power tool when the battery pack is connected to the power tool; and
    a charging port configured to supply power to an external device;
    wherein the charging port can be in an on state in which the charging port is operable to supply power to the external device and an off state in which the charging port is not operable to supply power to the external device.

11. The power tool system of claim 10, wherein the charging port is configured to change from the on state to the off state after a predetermined amount of time after charging from the charging port begins.

12. The power tool system of claim 11, wherein the predetermined amount of time is ten hours or less.

13. The power tool system of claim 11, wherein the predetermined amount of time is set by a user of the electronic device.

14. The power tool system of claim 11, wherein the predetermined amount of time set by the user is limited.

15. The power tool system of claim 11, wherein the predetermined amount of time is equal to or less than an Amp hour rating of the battery pack divided by a current drawn from the battery pack by the charging port.

16. The power tool system of claim 10, wherein the separate electronic device comprises one of a computer a tablet computer and a phone.

17. A power tool system comprising:
a plurality of power tools including a drill; and
at least one battery pack, the battery pack selectively couplable to the plurality of power tools to provide electrical power to a coupled power tool to which the battery pack is coupled, the battery pack comprising:
a housing,
at least one battery cell housed in the housing;
a wireless transmitter housed in the housing and configured to wirelessly communicate with an electronic device;
a connection section including a first electrical connector configured to supply power to the coupled power tool; and
a charging port configured to supply power to an external device;
wherein the charging port can be in an on state in which the charging port is operable to supply power to the external device and an off state in which the charging port is not operable to supply power to the external device.

18. The power tool system of claim 17, wherein the charging port is configured to change from the on state to the off state after a predetermined amount of time after charging from the charging port begins.

19. The power tool system of claim 18, wherein the predetermined amount of time is set by a user of the separate electronic device.

20. The power tool system of claim 18, wherein the predetermined amount of time is equal to or less than an Amp hour rating of the battery pack divided by a current drawn from the battery pack by the charging port.

* * * * *